US009657181B2

(12) United States Patent
Matsubayashi et al.

(10) Patent No.: US 9,657,181 B2
(45) Date of Patent: May 23, 2017

(54) COMPOSITION FOR ANTISTATIC RELEASE AGENT AND ANTISTATIC RELEASE FILM

(71) Applicants: SHIN-ETSU POLYMER CO., LTD., Tokyo (JP); SHIN-ETSU CHEMICAL CO. LTD., Tokyo (JP)

(72) Inventors: Sou Matsubayashi, Saitama (JP); Kohei Kanto, Saitama (JP); Kazuyoshi Yoshida, Saitama (JP); Kenji Yamamoto, Annaka (JP); Shinji Irifune, Annaka (JP)

(73) Assignees: SHIN-ETSU POLYMER CO., LTD., Tokyo (JP); SHIN-ETSU CHEMICAL CO., LTD., Tokyo (JP)

( * ) Notice: Subject to any disclaimer, the term of this patent is extended or adjusted under 35 U.S.C. 154(b) by 57 days.

(21) Appl. No.: 14/804,182

(22) Filed: Jul. 20, 2015

(65) Prior Publication Data
US 2015/0322273 A1 Nov. 12, 2015

Related U.S. Application Data

(63) Continuation-in-part of application No. PCT/JP2014/051386, filed on Jan. 23, 2014.

(30) Foreign Application Priority Data

Jan. 23, 2013 (JP) ................. 2013-010079

(51) Int. Cl.
H01B 1/24 (2006.01)
C09D 5/24 (2006.01)
C09D 141/00 (2006.01)
C09D 183/04 (2006.01)
C08G 77/18 (2006.01)

(52) U.S. Cl.
CPC ............ C09D 5/24 (2013.01); C09D 141/00 (2013.01); C09D 183/04 (2013.01); H01B 1/24 (2013.01); C08G 77/18 (2013.01); Y10T 428/31663 (2015.04)

(58) Field of Classification Search
CPC ........ C09J 7/0228; C08G 77/04; C08G 77/12; C08G 77/14; C08G 77/18; C09D 183/04; C09D 141/00; C09D 5/24; C08L 65/00; Y10T 428/31663; H01B 1/24
See application file for complete search history.

(56) References Cited

U.S. PATENT DOCUMENTS 6,084,040 A 7/2000 Jonas et al.
2003/0107026 A1* 6/2003 Fujiki ................. C08G 65/007
252/500
2007/0108420 A1 5/2007 Kuramoto
2008/0260981 A1* 10/2008 Mogi .................... B29C 33/405
428/36.8
2010/0168313 A1* 7/2010 Mizuno ................. C09J 183/04
524/500
2010/0188802 A1* 7/2010 Yoshida ............... C08G 61/124
361/525
2011/0111217 A1* 5/2011 Kuroda .................. C09J 7/0207
428/339
2012/0045635 A1* 2/2012 Aoki ....................... C09J 183/04
428/220
2012/0202055 A1* 8/2012 Kataoka ................. C09J 7/0296
428/336
2012/0328863 A1* 12/2012 Kuo ....................... C09J 183/04
428/220
2013/0096257 A1* 4/2013 Yamamoto ........... C09D 183/04
524/860

(Continued)

FOREIGN PATENT DOCUMENTS

CN 101678397 A 3/2010
EP 2896671 A1 7/2015

(Continued)

OTHER PUBLICATIONS

International Search Report for corresponding PCT/JP2014/051386, mailing date Apr. 28, 2014.

(Continued)

Primary Examiner — Mark Kopec
Assistant Examiner — Jaison Thomas
(74) Attorney, Agent, or Firm — Lando & Anastasi, LLP

(57) ABSTRACT

The invention relates to a composition for an antistatic release agent comprising: a release component, a conductive component, an organic solvent, and water, wherein the release component contains a condensation-type organopolysiloxane, the conductive component contains a complex with a π-conjugated electrically conductive polymer and a polyanion having a molecular weight of 20,000 to 900,000, an amount of the conductive component is 1 to 300 parts by mass, relative to 100 parts by mass of the release component, at least one amine compound selected from the group consisting of a secondary amine, a tertiary amine or a quaternary ammonium salt is coordinated to or bonded to portion of anion groups in the polyanion as an ion pair, and the water content is 5% by mass or less, relative to a total amount of the composition for an antistatic release agent. The present invention can provide a composition for an antistatic release agent containing a release component, which can be sufficiently cured, and having superior antistatic properties and release properties.

11 Claims, No Drawings

(56) References Cited

U.S. PATENT DOCUMENTS

| | | | | |
|---|---|---|---|---|
| 2014/0004360 | A1* | 1/2014 | Takahira | C09J 7/0228 428/447 |
| 2014/0342166 | A1* | 11/2014 | Yang | C09D 183/04 428/447 |
| 2014/0378608 | A1* | 12/2014 | Yang | C09D 183/04 524/588 |

FOREIGN PATENT DOCUMENTS

| | | |
|---|---|---|
| JP | 2636968 B2 | 8/1997 |
| JP | 10-088030 | 4/1998 |
| JP | 2002-241613 A | 8/2002 |
| JP | 2006-249303 A | 9/2006 |
| JP | 2007-254730 A | 10/2007 |
| JP | 2008-045061 A | 2/2008 |
| JP | 2009040969 A | 2/2009 |
| JP | 2011-032382 A | 2/2011 |
| JP | 2012-241130 A | 12/2012 |
| JP | 2014080608 A | 5/2014 |
| TW | 201233759 A | 8/2012 |
| WO | 2005/052058 A1 | 6/2005 |
| WO | 2008114916 A1 | 9/2008 |
| WO | 2014038626 A1 | 3/2014 |

OTHER PUBLICATIONS

Office Action in corresponding TW 103102423, mailing date Apr. 2, 2015.
European Search Report, corresponding EP 14743633.1, dated May 18, 2016.
Chinese Office Action for Application No. 201480005481.3 dated Aug. 18, 2016 with English Translation.
Japanese Office Action for Application No. 2014-558614 dated Sep. 8, 2016 with English Translation dated Sep. 13, 2016.

* cited by examiner

COMPOSITION FOR ANTISTATIC RELEASE AGENT AND ANTISTATIC RELEASE FILM

This application is a continuation-in-part application of PCT Application No. PCT/JP2014/051386, filed Jan. 23, 2014, which claims priority from Japanese Patent Application No. 2013-10079, filed Jan. 23, 2013, the contents of which are incorporated herein by reference.

TECHNICAL FIELD

The present invention relates to a composition for an antistatic release agent and an antistatic release film.

BACKGROUND ART

Substrates in which a silicone-based release agent is coated onto the surface of a substrate such as a plastic film or paper are widely used as release films.

However, the aforementioned substrates are likely to be electrically charged, and tend to become even more likely to be electrically charged when coated with a silicone-based release agent. Consequently, there has been a need to impart antistatic properties to these release films.

Although ionic conductive compounds such as surfactants have been widely used in the past as antistatic agents, since the conductivity of ionic conductive compounds is dependent on humidity, the antistatic properties thereof are unstable, while also having the problem of bleeding out from release films. Therefore, use of π-conjugated electrically conductive polymers, in which electrical conductivity is not dependent on humidity and which do not cause bleed-out, as antistatic agents for imparting antistatic properties to release films is known.

π-conjugated electrically conductive polymers are substances that are insoluble and infusible, and cannot be applied to coating or extrusion lamination. Therefore, Patent Document 1 discloses a liquid dispersion of a π-conjugated electrically conductive polymer in which a polyanion is added as a dopant and surfactant.

However, higher definition levels have come to be required by displays in recent years, and further improvement of mounting speed has come to be required in the field of component mounting in particular. Consequently, there is a growing need for protective films used in optical applications and antistatic base materials used for electronic and electrical components.

In response to these needs, Patent Document 2 proposes a release film that uses an addition reaction curing-type silicone emulsion and a release agent containing a thiophene-based electrically conductive polymer. However, adhesion property of emulsion-type silicone relative to a substrate is low. Since, a large amount of water is contained in the emulsion-type silicone, corrosion of the coating machine may occur. Therefore, there is a problem that the emulsion-type silicone is hard to use of an antistatic release film.

An antistatic release film has been known, in which an antistatic layer containing metal nanoparticles and a π-conjugated electrically conductive polymer is laminated on a substrate and a release agent layer containing silicone resin is laminated on the antistatic layer.

However, in the case, the antistatic layer and the release agent layer are formed independently, and hence, a plurality of coating operation is required, which lead to increase production cost. In the case of using metal nanoparticles, haze of antistatic layer tends to be increased, which is unsuitable for optical use.

Furthermore, silicone has low hydrophilicity, and hence, it hardly dissolves in aqueous dispersion containing a complex of a π-conjugated electrically conductive polymer and a polyanion. A non-aqueous electrically conductive polymer dispersion has studied instead of the aqueous dispersion.

As the non-aqueous electrically conductive dispersion, organic solvent solution of polyaniline is disclosed in Patent Document 3. In addition, in Patent Documents 4 to 6, an organic solvent dispersion is disclosed, in which the water contained in the aqueous dispersion containing a π-conjugated electrically conductive polymer and a polyanion is changed to an organic solvent. In Patent Document 7, an organic solvent dispersion is disclosed, which is prepared by freeze-drying aqueous dispersion containing a π-conjugated electrically conductive polymer and a polyanion, and dissolving the residue in an organic solvent.

PRIOR ART DOCUMENTS

Patent Documents

[Patent Document 1] Japanese Patent Publication No. 2636968

[Patent Document 2] Japanese Unexamined Patent Application, First Publication No. 2002-241613

[Patent Document 3] International Publication No. 2005/052058

[Patent Document 4] Japanese Unexamined Patent Application, First Publication No. 2006-249303

[Patent Document 5] Japanese Unexamined Patent Application, First Publication No. 2007-254730

[Patent Document 6] Japanese Unexamined Patent Application, First Publication No. 2008-045061

[Patent Document 7] Japanese Unexamined Patent Application, First Publication No. 2011-032382

DISCLOSURE OF THE INVENTION

Problems to be Solved by the Invention

Although the electrically conductive polymer dispersion obtainable by mixing an organic solvent solution disclosed in Patent Document 3 and silicone-based release agent is dissolved depending on the type of solvent, when drying, the silicone-based release agent and a complex composed of a π-conjugated electrically conductive polymer and a polyanion are separated. As a result, desirable antistatic properties and release properties cannot be obtained.

In the case where an organic solvent dispersion disclosed in Patent Documents 4 to 7 and silicone-based release agent are simply mixed, the silicone-based release agent and a complex composed of a π-conjugated electrically conductive polymer and a polyanion are not compatible. As a result, there is a difficulty in obtaining desirable antistatic properties and release properties. Furthermore, in general, hydrosilylation reaction is employed to cure silicone. However, in Patent Documents 4 to 7, although an organic solvent dispersion and a silicone-based release agent are mixed and then heated, the silicone is not cured and a release agent layer cannot be formed.

An object of the present invention is to provide a composition for an antistatic release agent containing a release component, which can be sufficiently cured, and having superior antistatic properties and release properties. Also, an object of the present invention is to provide an antistatic release film having superior antistatic properties and release properties.

Means for Solving the Problems

The present invention has the following aspects:

A composition for an antistatic release agent of the present invention includes: a release component that contains a condensation-curing type organopolysiloxane; a conductive component that contains a complex of a π-conjugated electrically conductive polymer and a polyanion having a molecular weight of 20,000 to 900,000; and an organic solvent, wherein an amount of the conductive component relative to 100 parts by mass of the release component is 1 to 300 parts by mass, at least one amine-type compound selected from the group consisting of a secondary amine, a tertiary amine or a quaternary ammonium salt is coordinated to or bonded to a portion of anion groups in the polyanion as an ion pair, and a water content is 5% by mass or less.

An antistatic release film of the present invention includes: a substrate composed of a plastic film or paper; and a release agent layer formed on at least one surface of the substrate, wherein the release agent layer is formed from the antistatic release agent.

The present invention has the following other aspects:

[1] A composition for an antistatic release agent includes a release component, a conductive component, an organic solvent and water, wherein the release component contains a condensation-curing type organopolysiloxane, the conductive component contains a complex of a π-conjugated electrically conductive polymer and a polyanion having a molecular weight of 20,000 to 900,000, an amount of the conductive component is 1 to 300 parts by mass, relative to 100 parts by mass of the release component, at least one amine-type compound selected from the group consisting of a secondary amine, a tertiary amine or a quaternary ammonium salt is coordinated to or bonded to a portion of anion groups in the polyanion as an ion pair, and the water content relative to a total amount of the composition for an antistatic release agent is 5% by mass or less.

[2] The composition for an antistatic release agent according to [1], wherein the amount of the water is 0.001 to 5% by mass.

[3] The composition for an antistatic release agent according to [1] or [2], wherein the organic solvent is at least one solvent selected from the group consisting of toluene, xylene, an acetic ester, methyl ethyl ketone, isopropyl alcohol, and diacetone alcohol.

[4] The composition for an antistatic release agent according to any one of [1] to [3], wherein the amine-type compound is at least one amine compound selected from the group consisting of tributylamine, tryhexylamine, trioctylamine, and a tertiary amine compound represented by the following formula I, II or III.

[Chemical Formula 1]

Chemical formula I
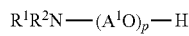

Chemical formula II
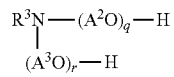

[Chemical Formula 2]

Chemical Formula III
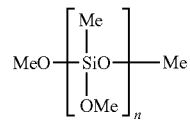

(n represents a positive number of 2 to 4)

[5] An antistatic release film including a substrate and a release agent layer formed on at least one surface of the substrate, wherein the substrate is composed of a plastic film or paper, and the release agent layer is formed by a hardened material of the composition for an antistatic release agent according to any one of [1] to [4].

Effects of the Invention

The composition for an antistatic release agent of the present invention contains a release component, which can be sufficiently cured, and has superior antistatic properties and release properties.

The antistatic release film of the present invention has superior antistatic properties and release properties.

MODE FOR CARRYING OUT THE INVENTION

Composition for an Antistatic Release Agent (Release Component)

A composition for an antistatic release agent of one aspect of the invention includes a release component, a conductive component, an organic solvent and water.

A release component contained in the composition for an antistatic release agent contains a condensation-curing type organopolysiloxane. The condensation-curing type organopolysiloxane is a silicone-based material that contains at least one composition selected from the group consisting of compositions (A) to (C) shown below, and is curable by condensation reaction. Namely, in one aspect of the present invention, the condensation-curing type organopolysiloxane means of an organopolysiloxane before curing.

The release component can be contained silicone materials except for the condensation-curing type organopolysiloxane, or other materials (for example, fluoride resins and the like) which has release properties except for silicone materials.

In one aspect of the present invention, a ratio of the conductive component in the composition for an antistatic release agent, relative to a mass of the release component, is preferably 1 to 300% by mass, and more preferably 1 to 20% by mass.

(A): a composition (A) includes components (A-1) to (A-3) shown below, in one aspect of the present invention.

Component (A-1): organopolysiloxane having at least two hydroxy groups within one molecule thereof Component (A-2): organopolysiloxane having at least three SiH groups within one molecule thereof Component (A-3): condensation catalyst (B): a composition (B) includes components (B-1) to (B-3) shown below, in one aspect of the present invention.

Component (B-1): organopolysiloxane having at least two hydroxy groups within one molecule thereof Component (B-2): organopolysiloxane having at least three hydrolyzable groups within one molecule thereof Component (B-3): condensation catalyst (C): a composition (C) that includes components (C-1) and (C-2) shown below.

Component (C-1): organopolysiloxane having at least three hydrolyzable groups within one molecule thereof Component (C-2): condensation catalyst Each of the component (A-1) and the component (B-1) is an organopolysiloxane having at least two hydroxy groups bonded directly to silicon atoms within one molecule thereof. The monovalent organic group other than hydroxyl group bonded directly to silicon atoms is not particularly limited, and specific examples thereof include a monovalent organic group having 1 to 10 carbon atoms, for example, alkyl groups such as a methyl group, an ethyl group, a propyl group, and a butyl group; cycloalkyl groups such as a cyclopentyl group, and a cyclohexyl group; aryl groups such as a phenyl group, and a naphthyl group; alkenyl groups such as a vinyl group, and a propenyl group. In the present invention, it is particularly preferable that 80 mol % or more of organic groups other than hydroxyl group is a methyl group. The molecular structure is also not particularly limited, in basically, a linear structure is preferable in industrial perspective, but a branched structure can be also used.

The viscosity of 30% by mass toluene solution of the organopolysiloxane as the component (A-1) or the component (B-1), determined using a rotating viscometer at 25° C., is preferably 50 mPa·s or more, and more preferably 50 to 100,000 mPa·s, and still more preferably 100 to 40,000 mPa·s.

As specific examples of the components (A-1) and (B-1), organopolysiloxanes represented by general formulae (1-1), (1-2) and (1-3) can be mentioned. In the formulae, R represents a hydroxy group, a monovalent hydrocarbon group having 1 to 20 carbon atoms, for example, an alkyl group such as a methyl group, an ethyl group, a propyl group, or a butyl group; a cycloalkyl group such as a cyclopentyl group, or a cyclohexyl group; an aryl group such as a phenyl group, or a naphthyl group; an alkenyl group such as a vinyl group, or a propenyl group, and siloxane residue represented by general formula (2-1) or (2-2). In the formulae (2-1) and (2-2), $R^1$ represents an oxygen atom or an alkylene group having 1 to 6 carbon atoms. As the alkylene group having 1 to 6 carbon atoms, a methylene group and an ethylene group can be mentioned. R is the same as above.

$\alpha 1$ represents an integer of 0 to 1,000, and preferably an integer of 0 to 900. $\beta 1$ represents an integer of 50 to 9,000, and preferably an integer of 60 to 900. $\alpha 2$ represents an integer of 0 to 900, and $\beta 2$ represents an integer of 0 to 9,000. $\gamma$ represents an integer of 1 to 3,000, and more preferably 1 to 2,000. In the formulae, a plurality of R may be the same or different, provided that, the organopolysiloxanes represented by general formulae (1-1), (1-2) and (1-3) have two or more hydroxy groups in one molecule thereof. Among these, organopolysiloxanes represented by general formulae (1-1) and (1-3) are preferable. The main skeleton except the structural units (dimethylhydroxysilyl group) at both terminals thereof preferably contains 70 to 100 mol % of dimethylsiloxane unit, 0 to 30 mol % of diphenylsiloxane unit, and 0 to 10 mol % of hydroxymethylsiloxane unit, relative to the total mole number of structural unit constituting the main skeleton; more preferably contains 80 to 100 mol % of dimethylsiloxane unit, 0 to 20 mol % of diphenylsiloxane unit, and 0 to 5 mol % of hydroxymethylsiloxane unit; and still more preferably contains 90 to 100 mol % of dimethylsiloxane unit and 0 to 10 mol % of diphenylsiloxane unit.

[Chemical Formula 3]

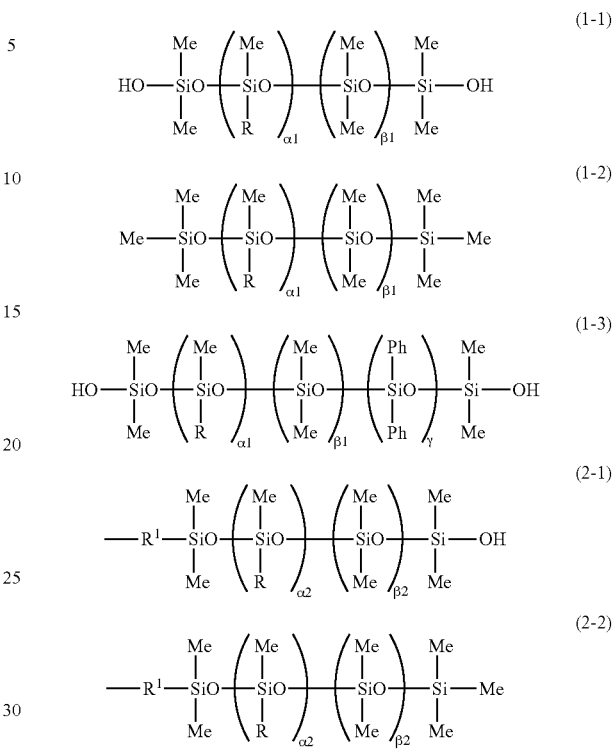

In the above formulae, Me represents a methyl group, and Ph represents a phenyl group.

The number of hydroxyl groups within one molecule of the component (A-1) or (B-1) is preferably 2 to 50, and more preferably 2 to 20.

As specific examples of the component (A-2), organohydrogenpolysiloxane can be mentioned, and specific examples thereof include a polymer of methylhydrogenpolysiloxane; a copolymer of methylhydrogenpolysiloxane and dimethylpolysiloxane; a copolymer of methylhydrogenpolysiloxane and methylphenylpolysiloxane; a copolymer of methylhydrogenpolysiloxane, dimethylpolysiloxane and methylphenylpolysiloxane; and a copolymer of methylhydrogenpolysiloxane, dimethylpolysiloxane and diphenylpolysiloxane.

In one aspect of the present invention, the organohydrogenpolysiloxane usable as a component (A-2) is not particularly limited, as long as it has at least three hydrogen atoms bonded directly to silicon atoms in the molecule thereof, more preferably 4 to 1,000 hydrogen atoms, still more preferably 4 to 200 hydrogen atoms. The molecular structure can be linear, branched or cyclic.

In one aspect of the present invention, the absolute viscosity of the organohydrogenpolysiloxane as the component (A-2), determined using a rotating viscometer at 25° C. may be several mPa·s to several tens of thousands mPa·s, preferably 2 to 1,000 mPa·s, still more preferably 5 to 300 mPa·s.

Specific examples of organohydrogenpolysiloxane include the compounds represented by general formulae (3-1) to (3-5) shown below.

[Chemical Formula 4]

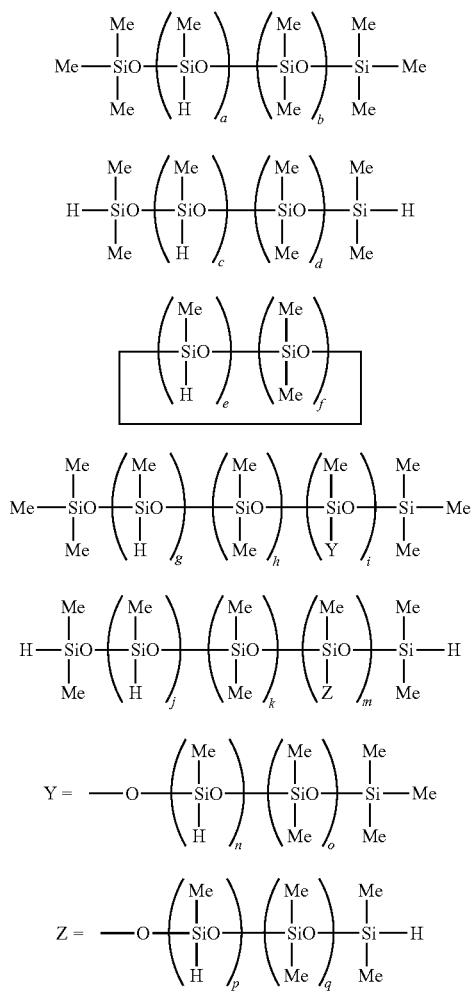

Provided that, in the structural formulae and compositional formulae, Me represents a methyl group, Y and Z are groups represented by general formulae (4-1) and (4-2), respectively. Each of "a" to "p" is a number such that one molecule contains three or more SiH groups and is an integer within the range as follows.

"a" and "e" each independently represents an integer of 3 to 500, and preferably an integer of 4 to 500. "c" represents an integer of 1 to 500, and preferably an integer of 2 to 400. "b", "d", "f", "g" "h", "i", "j", "k", "m", "n", "o", "p" and "q" each independently represents an integer of 0 to 500, and preferably an integer of 0 to 400.

Among these, organohydrogenpolysiloxane represented by general formula (3-1) or (3-4) is preferable, and organohydrogenpolysiloxane represented by general formula (3-1) is more preferable. In the formula (3-1), the main skeleton except the structural units (trimethylsilyl group) at both terminals thereof preferably contains 10 to 100 mol % of a structural unit represented by MeHSiO$_{2/2}$, relative to the total mole number of structural units constituting the main skeleton; and more preferably contains 20 to 100 mol % of a structural unit represented by MeHSiO$_{2/2}$.

Specific examples of the composition that contains (A-1) and (A-2) include, for example, a mixture of a silanol group-containing organopolysiloxane gum and a SiH group-containing organopolysiloxane oil (trade name: KS-705F, manufactured by Shin-Etsu Chemical Co., Ltd.).

The organopolysiloxane usable as the component (B-2) of the present invention is a compound having at least three hydrolyzable groups bonded to silicon atoms in one molecule thereof, preferably having 3 to 1,000 hydrolyzable groups, and more preferably having 3 to 200 hydrolyzable groups. Examples of hydrolyzable groups include alkoxy groups such as a methoxy group, an ethoxy group, a propoxy group, a butoxy group, a methoxyethoxy group, and an isopropenoxy group; and acyloxy groups such as an acetoxy group, provided that, these groups bond directly to silicon atoms. Part of these groups may have amino groups such as an ethylamino group, an amide group, oxime groups such as an ethylmethylbutanoxime group, halogen atoms such as a chlorine atom, a bromine atom.

As the hydrolyzable group, a methoxy group, an ethoxy group, a propoxy group and a butoxy group are preferable in industrial perspective, but organopolysiloxanes represented by general formulae (5-1) to (5-4) shown below can be used.

In the formulae (5-1) to (5-4), "r" represents an integer of 1 to 200, preferably an integer of 1 to 190, and more preferably 1 to 100. "s" represents an integer of 1 to 200, and preferably an integer of 1 to 190. "n" represents an integer of 1 to 100, preferably an integer of 1 to 50, and more preferably an integer of 2 to 30. In the formulae, Me represents a methyl group, and Et represents an ethyl group. Among these, the organopolysiloxyane represented by the general formula (5-4) is preferred.

In one aspect of the present invention, the absolute viscosity of the organopolysiloxane as a component (B-2) of the present invention, determined using a rotating viscometer at 25° C., is preferably 1 to 100 mPa·s, and more preferably 2 to 50 mPa·s.

[Chemical formula 5]

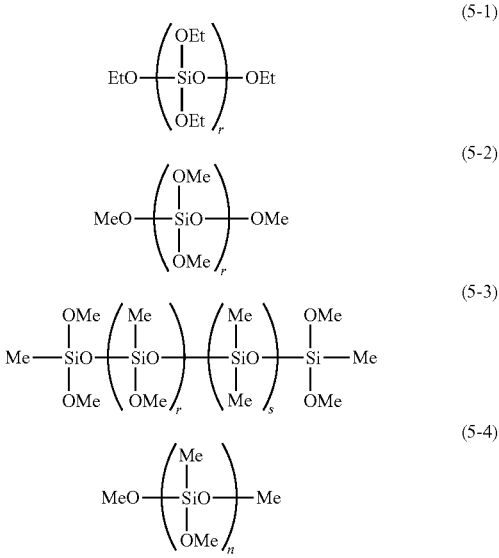

The organopolysiloxane having a branched or cyclic structure can be used instead of the organopolysiloxane represented by the aforementioned general formulae.

Part of the hydrogen atoms within an alkoxy group may be replaced by CH$_3$COO—, CH$_3$(C$_2$H$_5$)C=NO—, (C$_2$H$_5$)$_2$N—, CH$_3$CO(C$_2$H$_5$)N— or CH$_2$=(CH$_3$)CO—.

In one aspect of the present invention, as the component (C-1), the same component as that of component (B-2) can be mentioned.

As the component (C-1), the compound represented by the aforementioned formula (5-4) is preferred.

Each of the components (A-3), (B-3) and (C-2) is a catalyst which can condense and cure the components (A-1) and (A-2), the components (B-1) and (B-2), or the component (C-1) each other through dehydration, dehydrogenation and dealcoholation, and which can hydrolyze the hydrolyzable group of the components (B-2) and (C-1).

Such as a condensation catalyst, various metal catalysts, such as titanium compounds, zirconium compounds, aluminum compounds and tin compounds can be used. Among these, tin compounds can be preferably used. As the thin compounds, organic acid salts of tin, and polydentate ligand chelate compounds of tin can be mentioned.

As the organic salts of tin, in terms of excellent solubility, organic salts having 2 to 20 carbon atoms (e.g., salts of acetic acid, octyl acid, lauric acid and stearic acid) are preferable. Among these, carboxylic acid salt of tetravalent tin compound which has two alkyl groups bonded directly to a tin atom is more preferable. As the alkyl group, an octyl group, a decyl group and a dodecyl group can be mentioned, an alkyl group having 8 to 25 carbon atoms is preferable. Specifically, an octyl group is preferable.

As the polydentate ligand chelate compounds of tin, a compound in which a multidentate ligand such as catechol, crown ethers, polyvalent carboxylic acid, hydroxy acids, diketones, and keto acid thereof is coordinated to a tin atom can be mentioned. A compound coordinated a plurality of ligands to one molecule of tin may be used.

Specific examples of ligands include dicarboxylic acid, β-hydroxy acid, 1,3-diketone, β-keto acid, β-hydroxy ketone and substituted derivatives thereof. Among these, malonic acid, acetoacetic acid, acetylacetone, and substituted derivatives thereof are preferable. As the condensation catalyst, dioctyl tin diacetate, dioctyl tin dilaurate, dibutyl tin diacetate and dibutyl tin dilaurate are particularly preferable. Among these, dioctyl tin diacetate is most preferable.

As a hydrolyzable group in the components (B-2) and (C-1), for example, alkoxy groups (e.g., a methoxy group, an ethoxy group, a propoxy group, a butoxy group, a methoxyethoxy group, and an isopropenoxy), acetoxy groups (e.g., an acyloxy group), amino groups (e.g., an ethylamino group), an amide group, oxime groups (e.g., an ethylmethylbutanoxime group) can be mentioned, provided that, these groups bond directly to a silicon atom of organopolysiloxane. Among these, in terms of cost and safety, an alkoxy group and an acetoxy group are preferable.

When the components (B-2) and (C-1) are an alkoxy group-containing organopolysiloxane oil, specific examples thereof include, hydrolyzable silane monomers such as dimethyldimethoxysilane, methyltrimethoxysilane, tetramethoxysilane, diphenyldimethoxysilane, phenyltrimethoxysilane; partial hydrolysis condensates of the hydrolysable silane monomer; and co-condensates of the hydrolyzable silane monomer. In the case of being an acetoxy group (acyloxy group)-containing organopolysiloxane, specific examples thereof include hydrolyzable silane monomer such as dimethyldiacyloxysilane, methyltriacyloxysilane, tetraacyloxysilane, diphenyldiacyloxysilane, phenyltriacyloxysilane; partial hydrolysis condensates of the hydrolysable silane monomer; and co-condensates of the hydrolyzable silane monomer.

In addition, specific examples of the composition that contains (B-1) and (B-2) include a mixture of a silanol group-containing organopolysiloxane oil and an a SiH group-containing organopolysiloxane oil (trade name: KS-723B, X-62-470, manufactured by Shin-Etsu Chemical Co., Ltd.).

The amount of the component (A-1) in the composition (A), relative to the total amount of the composition (A), is preferably 99 to 80% by mass, and more preferably 98 to 90% by mass.

The amount of the component (A-2) in the composition (A), relative to the total amount of the composition (A), is preferably 1 to 20% by mass, and more preferably 2 to 15% by mass.

The amount of the component (A-3) in the composition (A), relative to 100 parts by mass of the sum of the components (A-1) and (A-2), is preferably 1 to 15 parts by mass, and more preferably 2 to 10 parts by mass.

The amount of the component (B-1) in the composition (B), relative to the total amount of the composition (B), is preferably 99 to 40% by mass, and more preferably 98 to 50% by mass.

The amount of the component (B-2) in the composition (B), relative to the total amount of the composition (B), is preferably 1 to 60% by mass, and more preferably 2 to 50% by mass.

The amount of the component (B-3) in the composition (B), relative to 100 parts by mass of the sum of the components (B-1) and (B-2), is preferably 1 to 15 parts by mass, and more preferably 2 to 10 parts by mass.

The amount of the component (C-2) in the composition (C), relative to 100 parts by mass of the composition (C-1), is preferably 1 to 15 part by mass, and more preferably 2 to 10 parts by mass.

When the compositional profile of the compositions (A) to (C) fulfills the above identified range, the objective release properties are reliably obtained.

(Conductive Component)

In one aspect of the present invention, the conductive component contained in the composition for an antistatic release agent contains a complex of a π-conjugated electrically conductive polymer and a polyanion. In particular, a π-conjugated electrically conductive polymer and a polyanion are complexed, by coordinating or doping a portion of anion group of the polyanion to the π-conjugated electrically conductive polymer and a polyanion.

The conductive component, if required, may contain a conductive material or ion conductive compound other than the complex.

In one aspect of the present invention, the amount of the conductive component in the composition for an antistatic release agent, relative to 100 parts by mass of the release component, is 1 to 300 parts by mass, more preferably 1 to 100 parts by mass, and still more preferably 1 to 50 parts by mass. When the amount of the conductive component is at least as large as the lower limit, antistatic properties are sufficiently obtained. When the amount of the conductive component is no more than the upper limit, release properties are sufficiently obtained.

[π-Conjugated Electrically Conductive Polymer]

The π-conjugated electrically conductive polymer is an organic polymer in which the main chain is composed with a π-conjugated system, and examples thereof include polypyrroles, polythiophenes, polyacetylenes, polyphenylenes, polyphenylenevinylenes, polyanilines, polyacenes, polythiophenevinylenes and copolymers thereof. Polypyrroles, polythiophenes and polyanilines are preferable from the viewpoint of ease in polymerization and stability in air. In terms of solubility in solvent and transparency, polythiophenes are preferable.

Specific examples of polythophenes include polythiophenes such as polythiophene, poly(3-methylthiophene), poly(3-ethylthiophene), poly(3-propylthiophene), poly(3-butylthiophene), poly(3-hexylthiophene), poly(3-heptylthiophene), poly(3-octylthiophene), poly(3-decylthiophene), poly(3-dodecylthiophene), poly(3-octadecylthiophene), poly(3-bromothiophene), poly(3-chlorothiophene), poly(3-iodothiophene), poly(3-cyanothiophene), poly(3-phenylthiophene), poly(3,4-dimethylthiophene), poly(3,4-dibutylthiophene), poly(3-hydroxythiophene), poly(3-methoxythiophene), poly(3-ethoxythiophene), poly(3-butoxythiophene), poly(3-hexyloxythiophene), poly(3-heptyloxythiophene), poly(3-octyloxythiophene), poly(3-decyloxythiophene), poly(3-dodecyloxythiophene), poly(3-octadecyloxythiophene), poly(3,4-dihydroxythiophene), poly(3,4-dimethoxythiophene), poly(3,4-diethoxythiophene), poly(3,4-dipropoxythiophene), poly(3,4-dibutoxythiophene), poly(3,4-dihexyloxythiophene), poly(3,4-diheptyloxythiophene), poly(3,4-dioctyloxythiophene), poly(3,4-didecyloxythiophene), poly(3,4-didodecyloxythiophene), poly(3,4-ethylenedioxythiophene), poly(3,4-propylenedioxythiophene), poly(3,4-butenedioxythiophene), poly(3-methyl-4-methoxythiophene), poly(3-methyl-4-ethoxythiophene), poly(3-carboxythiophene), poly(3-methyl-4-carboxythiophene), poly(3-methyl-4-carboxyethylthiophene) or poly(3-methyl-4-carboxybutylthiophene).

Examples of polypyrroles include polypyrrole, poly(N-methylpyrrole), poly(3-methylpyrrole), poly(3-ethylpyrrole), poly(3-n-propylpyrrole), poly(3-butylpyrrole), poly(3-octylpyrrole), poly(3-decylpyrrole), poly(3-dodecylpyrrole), poly(3,4-dimethylpyrrole), poly(3,4-dibutylpyrrole), poly(3-carboxypyrrole), poly(3-methyl-4-carboxypyrrole), poly(3-methyl-4-carboxyethylpyrrole), poly(3-methyl-4-carboxybutylpyrrole), poly(3-hydroxypyrrole), poly(3-methoxypyrrole), poly(3-ethoxypyrrole), poly(3-butoxypyrrole), poly(3-hexyloxypyrrole), and poly(3-methyl-4-hexyloxypyrrole).

Examples of polyanilines include polyaniline, poly(2-methylaniline), poly(3-isobutylaniline), poly(2-aniline sulfonic acid) and poly(3-aniline sulfonic acid).

Among the aforementioned π-conjugated electrically conductive polymers, poly(3,4-ethylenedioxythiophene) is preferable from the viewpoints of electrical conductivity, transparency and heat resistance.

[Polyanion]

The polyanion refers to a polymer having a structural unit having an anion group. The anion group of this polyanion functions as a dopant for the π-conjugated electrically conductive polymer, and improves the electrical conductivity of the π-conjugated electrically conductive polymer. In one aspect of the present invention, the polyanion is preferably a polymer having two or more anion groups in a molecule thereof. Thus, "a portion of an anion group of the poly anion is coordinated to a π-conjugated electrically conductive polymer", it means that at least one anion group in the polyanion is coordinated to a π-conjugated electrically conductive polymer.

Specific examples of the polyanion include polystyrene sulfonate, polyvinylsulfonate, polyallylsulfonate, polyacrylsulfonate, polymethacrylsulfonate, poly(2-acrylamido-2-methylpropanesulfonate), polyisoprene sulfonate, polysulfoethyl methacrylate, poly(4-sulfobutylmethacrylate), polymethacryloxybenzene sulfonate, polyvinyl carboxylate, polystyrene carboxylate, polyallylcarboxylate, polyacrylcarboxylate, polymethacrylcarboxylate, poly(2-acrylamide-2-methylpropanecarboxylate), polyisoprene carboxylate and polyacrylic acid. These may be homopolymers or copolymers of two or more types thereof. Polymers having a sulfonate group are most preferable.

The mass average molecular mass of the polyanion is preferably 20,000 to 900,000, more preferably 100,000 to 750,000, and still more preferably 200,000 to 600,000. When the mass average molecular mass of the polyanion is less than the aforementioned lower limit, there is a possibility that a π-conjugated electrically conductive polymer contained in the release agent becomes uneven. When the mass average molecular mass is more than the aforementioned upper limit, there is a tendency that the dispensability of the composition for an antistatic release agent is reduced. In other words, when the mass average molecular weight of the polyanion is within the aforementioned range, a π-conjugated electrically conductive polymer contained in the release agent does not become uneven and the dispensability of the composition for an antistatic release agent in the solvent does not be reduced.

The mass average molecular mass of the polyanion can be measured by using gel permeation chromatography (GPC). Further, the mass average molecular mass is a value measured by using polystyrene as standard material.

The molar amount of the polyanion doped to π-conjugated electrically conductive polymer is preferably within the range of 0.1 moles to 10 moles, and more preferably within the range of 1 mole to 7 moles, relative to 1 mole of the π-conjugated electrically conductive polymer (this molar amount means an average number of the polyanion per molecule of the π-conjugated electrically conductive polymer). Further, the amount, in terms of weight, of the polyanion doped to π-conjugated electrically conductive polymer is preferably within the range of 10 to 1,000 parts by weight, and more preferably within the range of 100 to 700 parts by weight, relative to 100 parts by weight of the π-conjugated electrically conductive polymer. If the content of the polyanion is less than the aforementioned lower limit value, the doping effect on the π-conjugated electrically conductive polymer tends to weaken, thereby resulting in a shortage of electrical conductivity. Moreover, since dispersibility and solubility of the complex in the solvent become low, it becomes difficult to obtain a uniform dispersion. In addition, if the content of the polyanion exceeds the aforementioned upper limit value, the content of the π-conjugated electrically conductive polymer in the solvent decreases, thereby making it difficult to obtain adequate electrical conductivity. In other words, if the content of the polyanion is within the aforementioned range, the electrically conductivity does not become weak, dispersibility and solubility of the complex in the solvent do not become low, and as a result, it can obtain a uniformly dispersion.

In the polyanions, at least one anion group of all anion groups does not dope π-conjugated electrically conductive polymer. In other words, surplus anion groups are present. Since these surplus anion groups are hydrophilic groups, they fulfill the role of improving water dispersibility of the aforementioned complex.

In this invention, a portion of anion groups of the polyanion, specifically, a surplus anion group, which does not dope the π-conjugated electrically conductive polymer, is coordinated to or bonded to at least one amine compound selected from the group consisting of a secondary amines, a tertiary amines and a quaternary ammonium salt as an ion pair. When a surplus anion group is coordinated to or bonded to at least one amine compound, the hydrophilicity is decreased and the hydrophobicity is increased, and hence, dispersibility of the complex in organic solvent and compatibility with an organopolysiloxane are improved.

Here, "coordinated" means that the amine compound is bonding to the surplus anion group by providing an ion pair thereof. In addition, "bonded" means that the amine compound is bonding to the surplus anion group as a cationic group by an ionic binding.

The amine compound which is coordinated to or bonded to a surplus anion group is not limited specifically as long as the effects of the present invention are achieved. However, in the case of considering the solubility of the amine compound to the silicone resin, it is preferable to select an amine compound which has at least one substituent selected from the group consisting of an alkyl group having 4 or more and 12 or less carbon atoms, an aryl group having 6 or more and 10 or less carbon atoms, an aralkyl group having 7 or more and 10 or less carbon atoms, an alkylene group having 2 or more and 4 or less carbon atoms, an arylene group having 6 or more and 10 or less carbon atoms, an aralkylene group having 7 or more and 10 or less carbon atoms and an oxyalkylene group having 2 or more and 6 or less carbon atoms. When the amine compound which is coordinated to or bonded to a surplus anion group has the substituent, hydrophobicity can be further enhanced.

As the alkyl group having 4 or more and 12 or less carbon atoms, a butyl group, a pentyl group, a hexyl group, a heptyl group, an octyl group, an undecyl group and a dodecyl group can be mentioned.

As the aryl group, a phenyl group, a tolyl group, a xylyl group, and a naphthyl group can be mentioned.

As the aralkyl group, a benzyl group, and a phenethyl group can be mentioned.

As the alkylene group, an ethylene group, a propylene group and a butylene group can be mentioned.

As the arylene group, a phenylene group and a naphthylene group can be mentioned.

As the aralkylene group, a benzylene group and a phenethylene group can be mentioned.

As the oxyalkylene group, an ethyleneoxide group, a propyleneoxide group and a tetraethyleneoxide group can be mentioned.

As the secondary amine having a substituent, methyloctylamine, methylbenzylamine, N-methylaniline, dibutylamine, di-2-ethylhexylamine, dioctylamine, diundecylamine, didodecylamine and diheptylamine can be mentioned. Among these, diundecylamine or didodecylamine is preferable from the view of the dispersibility to the solvent.

As the tertiary amine having a substituent, tributylamine, tripentylamine, trihexylamine, triheptylamine, trioctylamine, tridecylamine, triundecylamine, tridodecylamine, triphenylamine, tribenzylamine, triperfluoropropylamine, triperfluorobutylamine, tri-2-ethylhexylamine, didecylmethylamine, dimethyloctadecylamine, and N,N-dibenzylaniline can be mentioned. Among these, tributylamine, trihexylamine or trioctylamine is preferable from the view of the dispersibility to the solvent.

As the quaternary ammonium salt having a substituent, methyltrihexylammonium chloride, methyltrioctylammonium chloride, methyltridecylammonium chloride, methyltridodecylammonium chloride, dioctyldimethylammonium bromide, Didecyldimethylammonium bromide, di-dodecyldimethylammonium bromide, tetrahexylammonium bromide, tetraoctylammonium bromide, tetradecylammonium bromide, tetra-dodecylammonium bromide, 1-dodecyl-2-methyl-3-benzylimidazolium chloride, 1-tetradecyl-2-methyl-3-benzylimidazolium chloride, 1-hexadecyl-2-methyl-3-benzylimidazolium chloride, 1-octadecyl-2-methyl-3-benzyl-imidazolium chloride, 1-hexyl-3-methylimidazolium chloride, 1-octyl-3-methylimidazolium chloride, methylpyridinium chloride, ethylpyridinium chloride, propylpyridinium chloride, butylpyridinium chloride, hexylpyridinium chloride, octylpyridinium chloride, decylpyridinium chloride, dodecylpyridinium chloride and hexadodecylpyridinium chloride can be mentioned.

As the amine compound having the oxyalkylene group, for example, compounds represented by chemical formula I or II shown below can be mentioned.

[Chemical Formula 6]

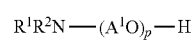 Chemical formula I

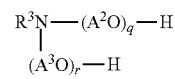 Chemical formula II

In the formula I, $R^1$ $R^2$ each independently represents an alkyl group of 1 to 24 carbon atoms; $A^1O$ represents an oxyalkylene group having 2 to 4 carbon atoms; and $(A^1O)_p$ represents one or more kinds oxyalkylene group chain having 2 to 4 carbon atoms. Here, a sum of carbon atoms of at least one substituent selected from $R^1$, $R^2$ and $(A^1O)_p$ needs to be 4 or more.

In the formula II, $R^3$ represents an alkyl group having 1 to 24 carbon atoms; $A^2O$ and $A^3O$ each independently represents an oxyalkylene group having 2 to 4 carbon atoms; and $(A^2O)_q$ and $(A^3O)_r$ represent one or more kinds oxyalkylene group chain having 2 to 4 carbon atoms. Here, a sum of carbon atoms of at least one substituent selected from $R^3$, $(A^2O)_q$ and $(A^3O)_r$ needs to be 4 or more.

In the formula I or II, p, q and r each independently represents $1 \leq p, q, r \leq 100$, and they meet the requirement of $0 < q + r \leq 100$.

Specifically, compounds can be selected from each of the product series of Ionet (trade name, Sanyo Chemical Industries, Ltd.), Nymeen (trade name, NOF Corp.), or Ethomeen (trade name, Lion Akzo Co., Ltd.) and the like.

In one aspect of the present invention, the tertiary amine compound is preferable, and more preferable tributylamine, trihexylamine, trioctylamine, or the tertiary amine compound having the oxyalkylene group which is represented by the formula I or II, as the aforementioned amine compound which is coordinated to or bonded to a surplus anion group.

The amount of amine compound relative to the polyanion is preferably 0.1 to 10 molar equivalents, more preferably 0.5 to 2.0 molar equivalents, and still more preferably 0.85 to 1.25 molar equivalents.

(Organic Solvent)

As the organic solvent in the composition for an antistatic release agent of the present invention, solvents, for example, toluene, xylene, acetic acid ester which dissolve the release component may be used, or solvents, for example, ketone solvents such as methyl ethyl ketone, alcohol solvents such as isopropyl alcohol, diacetone alcohol, which dissolve the conductive component may be used and these solvents may be used in combination. However, in the case where the release component contains the composition (A), when alcohol solvent is used, since the dehydrogenation reaction occurs between the hydrosilyl group and a hydroxyl group as a side reaction, it is necessary to pay attention to the amount of the alcohol solvent to be used. In other words, in one aspect of the present invention, in the case of where the release component contains the composition (A), methylethylketone is preferable to use as the organic solvent.

In the case where the release component contains composition (B) or (C), when the alcohol solvent is used, storage stability of the composition for an antistatic release agent can be improved. Therefore, the organic solvent may be appropriately selected depending on the materials contained in the composition for an antistatic release agent. In other words, in one aspect of the present invention, in the case where the composition for an antistatic release agent contains the composition (B) or (C) as the release component, the alcohol solvent is preferable to use as the organic solvent.

The amount of organic solvent is appropriately adjusted depending on a predetermined thickness of release agent layer and the composition of each component. In general, when the total mass of the release component and conductive component is 1, the amount of organic solvent is within the range of 0.1 to 100.

(Water Content)

In the composition for an antistatic release agent of the present invention, a water content relative to the total amount of the composition for an antistatic release agent is 5 mass % or less, and 3 mass % or less is preferable. If the water content is more than the aforementioned upper limit, curability of the release agent and releasing properties become low. Further, it has a risk that the releasing properties change over time.

When the composition for an antistatic release agent which does not contain any water is prepared, it needs to be sufficiently dehydrated, and it is not practical. Therefore, the water content is preferably 0.001 mass % or more. In the case of performing a freezing-dry of a conductive complex at the time of manufacture of the composition for an antistatic release agent, solubility of the conductive complex into the organic solvent is facilitated by adding a small amount of water. Therefore, the water content is preferably 0.005 mass % or more, and more preferably 0.01 mass % or more. In other words, in one aspect of the present invention, the water content in the composition for an antistatic release agent is preferably 0.001 to 5 mass %, more preferably 0.005 to 5 mass %, and most preferably 0.01 to 3 mass %.

The water content of the present invention is a value measured by using a coulometric-method Karl Fischer moisture meter Model CA-100 or an automatic moisture measuring apparatus VA-124S (both manufactured by Mitsubishi Chemical Analytech Co., Ltd).

(Conductivity Improvers)

In the composition for an antistatic release film of the present invention may include a conductive improver as a second dopant.

As a conductive improver, glycidyl compounds, polar solvents, polyhydric aliphatic alcohols, nitrogen-containing aromatic cyclic compounds, compounds having two or more hydroxyl groups, compounds having two or more carboxyl groups, compounds having one or more hydroxyl group and one or more carboxyl group, and lactam compound can be mentioned.

Among these, conductive improver which is less likely to inhibit curing of the release component is preferable. When a conductive improver which is less likely to inhibit curing of the release component is used, after an adhesive layer composed of adhesive sheet is stacked on a release agent layer formed from the composition for an antistatic release agent, transference of the release agent onto the adhesive layer can be suppressed.

As a conductive improver which is less likely to inhibit curing of the release component, glycidyl compounds, polar solvents and polyhydric aliphatic alcohols can be mentioned.

The conductive improver is preferably in a liquid state at 25° C. When a conductive improver is in a liquid state, the transparency of the release agent layer formed from the composition for an antistatic release agent can be improved, and the transference of foreign material into an adhesive layer to be laminated on the release agent layer can be suppressed.

Specific examples of glycidyl compounds include ethyl glycidyl ether, n-butyl glycidyl ether, t-butyl glycidyl ether, allyl glycidyl ether, benzyl glycidyl ether, glycidyl phenyl ether, bisphenol A diglycidyl ether, acrylic acid glycidyl ether and methacrylic acid glycidyl ether. Among these, ethyl glycidyl ether or n-butyl glycidyl ether is preferable from the view of the solvent solubility.

Specific examples of polar solvents include N-methylformamide, N-methyl acrylamide, N-methylmethacrylamide, N-ethyl acrylamide, N-ethylmethacrylamide, N, N-dimethylacrylamide, N, N-dimethyl methacrylamide, N, N-diethyl acrylamide, N, N-diethyl methacrylamide, 2-hydroxyethyl acrylamide, 2-hydroxyethyl methacrylamide, N-methylol acrylamide, N-methylol methacrylamide, N-methyl-2-pyrrolidone, N-methylacetamide, N, N-dimethylformamide, N, N-dimethylacetamide, dimethyl sulfoxide, hexamethylene phosphortriamide, N-vinylpyrrolidone, N-vinyl formamide, N-vinyl acetamide, methyl lactate, ethyl lactate and propyl lactate. Among these, methyl lactate or dimethyl sulfoxide is preferable from the view of the solvent dispersibility.

As polyhydric aliphatic alcohols, ethylene glycol, diethylene glycol, propylene glycol, 1,3-butylene glycol, 1,4-butylene glycol, glycerol, diglycerol, isoprene glycol, butanediol, 1,5-pentanediol, 1,6-hexanediol, 1,9-nonanediol, neopentyl glycol, trimethylol ethane, trimethylol propane, thiodiethanol and dipropylene glycol can be mentioned. Among these, ethylene glycol or propylene glycol is preferable from the view of the solvent dispersibility.

The amount of the conductive improver relative to 100 parts by mass of conductive component is preferably 10 to 10,000 parts by mass, and more preferably 30 to 5,000 parts by mass. When the amount of the conductive improver is at least as large as the lower limit, antistatic properties can be further increased. However, when the amount of the conductive improver is greater than the upper limit, release properties is likely to be deteriorated.

(Manufacturing Method)

In one aspect of the present invention, as a manufacturing method of the composition for an antistatic release agent, a method including a step of polymerizing a monomer for forming a π-conjugated electrically conductive polymer in an aqueous solution of a polyanion and obtaining an aqueous solution of a conductive complex, a step of obtaining a powder of the conductive complex by performing a freezing-dry of the aqueous solution of the conductive complex, and a step of adding organic solvents and amine compounds into the powder of the conductive complex can be mentioned.

As the other manufacturing method of the composition for an antistatic release agent, a method including a step of polymerizing a monomer for forming a π-conjugated electrically conductive polymer in an aqueous solution of a polyanion and obtaining an aqueous solution of a conductive complex, a step of adding organic solvents and amine compounds into the aqueous solution of the conductive complex, and a step of adjusting water of the composition for an antistatic release agent to a preferred range can be mentioned.

In the aforementioned methods, organic solvents and amine compounds may be added at the same time or either may be added first.

(Function and Effect)

Previously, a complex in which a polyanion has doped with a π-conjugated electrically conductive polymer has low compatibility with a condensation-curing type organopolysiloxane which constitutes a release component. Therefore, when the complex in which a polyanion has doped with a π-conjugated electrically conductive polymer and the condensation-curing type organopolysiloxane are mixed, uniform dispersion cannot be obtained, and hence, it is difficult to exert antistatic properties and release properties satisfactorily.

In the present invention, since the amine compound having the specific substituent is coordinated to or bonded to a surplus anion group of a polyanion, and hence, the hydrophobicity of the complex is increased. Therefore, since the compatibility between the condensation-curing type organopolysiloxane and a complex in which a polyanion has doped a π-conjugated electrically conductive polymer is enhanced, they are uniformly dispersed in the composition for an antistatic release agent, respectively. As a result, both antistatic properties and release properties of the composition for an antistatic release agent can be exerted.

In addition, since the composition for an antistatic release agent has low water content, curability of the condensation-curing type organopolysiloxane has become high. As a result, reduction of release properties less likely occurs, and change with time of release properties is suppressed too.

In the present invention, "compatibility" is not limited to the degree of compatibility in a microscopic molecular level, and includes the degree of compatibility in macro level. When a high level of compatibility is obtained, even though the mixture is separated by a microscopic observation (for example, using an electron microscope), but the mixture is compatible each other by a macro observation (for example, visually observation).

The composition for an antistatic release agent of the present invention has low water content, and therefore it has a high adhesive property relative to a plastic film. The composition for an antistatic release agent of the present invention also has a high adhesive property relative to paper.

Furthermore, the composition for an antistatic release agent of the present invention has a high transparency.

<Antistatic Release Film>

The antistatic release film of the present invention contains: a substrate composed of a plastic film or paper; and a release agent layer formed on at least one surface of the substrate.

The release agent layer constituting the antistatic release film of the present invention is a layer formed from the composition for an antistatic release agent.

In other words, in one aspect of the present invention, the use of a composition for an antistatic release agent as a raw material of an antistatic release film, and wherein the composition for an antistatic released agent includes a release component, a conductive component, an organic solvent and water, wherein the release component contains a condensation-curing type organopolysiloxane, the conductive component contains a complex of a π-conjugated electrically conductive polymer and a polyanion having a molecular weight of 20,000 to 900,000, an amount of the conductive component relative to 100 parts by mass of the release component is 1 to 300 parts by mass, at least one amine-type compound selected from the group consisting of a secondary amine, a tertiary amine or a quaternary ammonium salt is coordinated to or bonded to a portion of anion groups in the polyanion as an ion pair, and the water content relative to a total amount of the composition for an antistatic release agent is 5% by mass or less.

Other aspect of the present invention is the method for producing an antistatic release film, wherein the aforementioned composition for an antistatic release agent is used as a raw material.

In one aspect of the present invention, examples of resin materials constituting a plastic film include polyethylene, polypropylene, polystyrene, polyvinyl chloride, polyvinyl alcohol, polyethylene terephthalate, polybutylene terephthalate, polyethylene naphthalate, polyacrylate, polycarbonate, polyvinylidene difluoride, polyarylates, styrene-based elastomer, polyester-based elastomer, polyether sulfone, polyether imides, polyether ether ketone, polyphenylene sulfide, polyarylate, polyimide, polycarbonate, cellulose triacetate and cellulose acetate propionate. Among these, polyethylene terephthalate is preferable from the view of transparency, flexibility, stain-prevention property and strength.

As paper, quality paper, kraft paper and coated paper can be used.

As the method of producing the antistatic release film, a method including: applying the composition for an antistatic releasing agent to at least one surface of the plastic film; and drying and curing the antistatic releasing agent to form an antistatic releasing film.

As the method of applying the composition for an antistatic releasing agent, a method using a coating machine such as a bar coater, a gravure coater, an air knife coater, a roll coater, a wire bar can be employed. The coating amount specifically as long as the effects of the present invention are achieved, but in general, the solid content is preferably within the range from 0.1 to 2.0 g/m$^2$.

Since the antistatic release film of the present invention contains a release agent layer containing the aforementioned composition for an antistatic release agent, and has excellent antistatic properties and release properties. Therefore, the antistatic release film of the present invention is preferably used as an adhesive sheet for optical parts or electronic and electrical parts.

EXAMPLES

Although the following indicates examples and comparative examples of the present invention, the present invention is not limited to the following examples. In the following examples, "parts" means "parts by mass", and "%" means "% by mass".

Production Example 1

206 g of sodium styrene sulfonate were dissolved in 1,000 ml of the ion exchange water, 1 g of ammonium persulfate oxidizer solution obtained by preliminarily dissolving in 10 ml of water was dropped thereto over 20 minutes while stirring at 80° C., and further stirring the solution for 12 hours.

1,000 ml of sulfuric acid diluted to 10% by mass was added to the resulting sodium styrene sulfonate-containing solution. Subsequently, about 1,000 ml of polystyrene sulfonate-containing solution were removed using ultrafiltration. Moreover, 2,000 ml of ion exchange water were added to the residual liquid, and about 2,000 ml of solution were removed using ultrafiltration. The aforementioned ultrafiltration procedure was repeated three times. Subsequently, 2,000 mL of ion exchange water were added to the obtained filtrate, and about 2,000 mL of solution were removed using ultrafiltration. The aforementioned ultrafiltration procedure was repeated three times. The water in the resulting solution was removed under reduced pressure to obtain polystyrene sulfonate in the form of a colorless solid. The mass average molecular mass of this polystyrene sulfonate measured by GPC (GPC101, manufactured by Showa Denko K. K.; TSK GEL α-M, manufactured by TOSOH CORPORATION is used as a column; 50 mmol-LiBr aqueous solution/acetonitrile=6/4 is used as an eluent) and using styrene as a standard material was 300,000.

Production Example 2

The polystyrene sulfonate having a mass average molecular mass of 200,000 was obtained in the same manner as in the Production Example 1 except that the additive amount of ammonium persulfate oxidizer solution was changed to 3 g.

Production Example 3

The polystyrene sulfonate having a mass average molecular mass of 500,000 was obtained in the same manner as in the Production Example 1 except that the additive amount of ammonium persulfate oxidizer solution was changed to 0.1 g.

Production Example 4

The polystyrene sulfonate having a mass average molecular mass of 1,000,000 was obtained in the same manner as in the Production Example 1 except that the additive amount of ammonium persulfate oxidizer solution was changed to 0.015 g.

Production Example 5

14.2 g of 3,4-ethylenedioxythiophene and a solution obtained by dissolving 36.7 g of the polystyrene sulfonate (mass average molecular mass is 300,000) obtained in Production Example 1 in 2,000 ml of ion exchange water were mixed at 20° C.
While holding at 20° C., an oxidation catalyst solution obtained by dissolving 29.64 g of ammonium persulfate and 8.0 g of ferric sulfate in 200 ml of ion exchange water were slowly added to the resulting mixed solution while stirring. The reaction was allowed to proceed for 3 hours.
2,000 ml of ion exchange water were added to the resulting reaction liquid and about 2,000 ml of the solution were removed using ultrafiltration. This procedure was repeated three times.
Next, 200 ml of dilute sulfuric acid having a concentration of 10% and 2,000 ml of ion exchange water were added to the treated liquid on which the aforementioned ultrafiltration was carried out, and about 2,000 ml of the treated liquid were removed using ultrafiltration. Subsequently, 2,000 ml of ion exchange water were further added to the solution, and about 2000 ml of liquid were removed using ultrafiltration. This procedure was repeated three times.
Moreover, 2,000 ml of ion exchange water were added to the resulting treated liquid and about 2,000 ml of the treated liquid were removed by ultrafiltration. This procedure was repeated five times to obtain an aqueous dispersion of polystyrene sulfonate-doped poly(3,4-ethylenedioxythiophene) (hereinafter, referred to as "PEDOT-PSS aqueous dispersion") having 1.2% concentration.

Production Example 6

The PEDOT-PSS aqueous dispersion having a concentration of 1.2% was obtained in the same manner as in the Production Example 5 except that polystyrene sulfonate having a mass average molecular weight of 200,000 of the Production Example 2 was used.

Production Example 7

The PEDOT-PSS aqueous dispersion having a concentration of 1.2% was obtained in the same manner as in the Production Example 5 except that polystyrene sulfonate having a mass average molecular weight of 500,000 of the Production Example 3 was used.

Production Example 8

The PEDOT-PSS aqueous dispersion having a concentration of 1.2% was obtained in the same manner as in the Production Example 5 except that polystyrene sulfonate having a mass average molecular weight of 1,000,000 of the Production Example 4 was used.

Production Example 9

1,000 g of the PEDOT-PSS aqueous dispersion obtained by the Production Example 5 was freeze-dried to obtain 12 g of powder of PEDOT-PSS. To the obtained 12.0 g of powder of PEDOT-PSS, 2,882 g of isopropanol and 10.6 g of trioctylamine were added and mixed to obtain the isopropanol dispersion (1) of PEDOT-PSS having a concentration of 0.4%. The resulting dispersion was uniformly dispersed in the state of a blue transparent.

Production Example 10

The isopropanol dispersion (2) of PEDOT-PSS having a concentration of 0.4% was prepared in the same manner as in the Production Example 9 except that 8.1 g of trihexylamine was used instead of 10.6 g of trioctylamine.

Production Example 11

The isopropanol dispersion (3) of PEDOT-PSS having a concentration of 0.4% was prepared in the same manner as in the Production Example 9 except that 5.56 g of tributylamine was used instead of 10.6 g of trioctylamine.

Production Example 12

The isopropanol dispersion (4) of PEDOT-PSS having a concentration of 0.4% was prepared in the same manner as in the Production Example 9 except that 3.0 g of mono-n-hexylamine was used instead of 10.6 g of trioctylamine. The resulting dispersion was unstable and sedimentation has occurred Production Example 13

The isopropanol dispersion (5) of PEDOT-PSS having a concentration of 0.4% was prepared in the same manner as in the Production Example 9 except that 1.8 g of Ethomeen C25 (trade name, Lion Akzo Co., Ltd.) was used instead of 10.6 g of trioctylamine. The resulting dispersion was uniformly dispersed in the state of a blue transparent.

Production Example 14

The isopropanol dispersion (6) of PEDOT-PSS having a concentration of 0.4% was prepared in the same manner as in the Production Example 9 except that the PEDOT-PSS aqueous dispersion (a mass average molecular mass of PSS is 200,000) obtained by the Production Example 6 was used. The resulting dispersion was uniformly dispersed in the state of a blue transparent.

Production Example 15

The isopropanol dispersion (7) of PEDOT-PSS having a concentration of 0.4% was prepared in the same manner as in the Production Example 9 except that the PEDOT-PSS aqueous dispersion (a mass average molecular mass of PSS is 500,000) obtained by the Production Example 7 was used. The resulting dispersion was uniformly dispersed in the state of a blue transparent.

Production Example 16

The isopropanol dispersion (10) of PEDOT-PSS having a concentration of 0.4% was prepared in the same manner as in the Production Example 9 except that the PEDOT-PSS aqueous dispersion (a mass average molecular mass of PSS is 1,000,000) obtained by the Production Example 8 was used. The resulting dispersion was unstable and sedimentation has occurred.

<Preparation of Composition for a Release Agent>

A condensation-curing type organopolysiloxane used in the following examples will be explained as follows.

KS-723A: manufactured by Shin-Etsu Chemical Co., Ltd.; active ingredient about 20%; an alkoxyl group-containing organopolysiloxane oil has contained.

KS-723B: manufactured by Shin-Etsu Chemical Co., Ltd.; active ingredient about 50%; a mixture of a silanol group-containing organopolysiloxane oil and an alkoxyl group-containing organopolysiloxane oil.

X-62-470: manufactured by Shin-Etsu Chemical Co., Ltd.; active ingredient about 30%; a mixture of a silanol group-containing organopolysiloxane gum and an alkoxyl group-containing organopolysiloxane oil.

KS-705F: manufactured by Shin-Etsu Chemical Co., Ltd.; active ingredient about 30%; a mixture of a silanol group-containing organopolysiloxane gum and a SiH group-containing organopolysiloxane oil.

Among the above mentioned, the combination of KS-723A, KS-723B and dioctyl tin diacetate is a "composition (B)". The combination of X-62-470 and dioctyl tin diacetate is a "composition (B)". The combination of KS-705F and dioctyl tin diacetate is a "composition (A)".

The amount of the conductive component relative to 100 parts by mass of the release component and the water content of the composition for a release agent in each example were indicated in Tables 1 and 2.

Example 1

10.9 g of KS-723 A, 2.74 g of KS-723B as condensation-curing type organopolysiloxanes and 0.5 g of dioctyl tin diacetate as a condensation catalyst were added to 30 g of isopropanol dispersion (1) of PEDOT-PSS obtained in Production Example 9. Then, the mixture was diluted with 45.86 g of methyl ethyl ketone and 10.0 g of diacetone alcohol, thereby obtaining a composition for a release agent.

Example 2

10.0 g of X-62-470 as a condensation-curing type organopolysiloxane and 0.4 g of dioctyl tin diacetate as a condensation catalyst were added to 30 g of isopropanol dispersion (1) of PEDOT-PSS obtained in Production Example 9. Then, the mixture was diluted with 59.6 g of methyl ethyl ketone, thereby obtaining a composition for a release agent.

Example 3

The composition for a release agent was obtained in the same manner as in the Example 2, except that X-62-470 of the condensation-curing type organopolysiloxane was changed to KS-705F.

Example 4

0.456 g of KS-723B as a condensation-curing type organopolysiloxane and 0.018 g of dioctyl tin diacetate as a condensation catalyst were added to 170 g of the isopropanol dispersion (1) of PEDOT-PSS obtained in the Production Example 9. Then, the mixture was diluted with 45.86 g of methyl ethyl ketone and 10.0 g of diacetone alcohol, thereby obtaining a composition for a release agent.

Example 5

The composition for a release agent was obtained in the same manner as in the Example 4, except that the amount of the isopropanol dispersion (1) of PEDOT-PSS obtained in the Production Example 9 was changed to 120 g.

Example 6

The composition for a release agent was obtained in the same manner as in the Example 4, except that the amount of the isopropanol dispersion (1) of PEDOT-PSS obtained in the Production Example 9 was changed to 60 g.

Example 7

The composition for a release agent was obtained in the same manner as in the Example 1, except that the amount of KS-723A was changed to 0.568 g, the amount of KS-723B was changed to 0.143 g, and the amount of dioctyl tin diacetate was changed to 0.028 g.

Example 8

The composition for a release agent was obtained in the same manner as in the Example 1, except that the amount of KS-723A was changed to 1.09 g, the amount of KS-723B was changed to 0.247 g, and the amount of dioctyl tin diacetate was changed to 0.054 g.

Example 9

The composition for a release agent was obtained in the same manner as in the Example 1, except that the amount of KS-723A was changed to 2.18 g, the amount of KS-723B was changed to 0.548 g, and the amount of dioctyl tin diacetate was changed to 0.108 g.

Example 10

The composition for a release agent was obtained in the same manner as in the Example 1, except that the amount of KS-723A was changed to 4.36 g, the amount of KS-723B was changed to 1.096 g, and the amount of dioctyl tin diacetate was changed to 0.216 g.

Example 11

The composition for a release agent was obtained in the same manner as in the Example 2, except that the amount of the isopropanol dispersion (1) of PEDOT-PSS was changed to 20 g.

Example 12

The composition for a release agent was obtained in the same manner as in the Example 2, except that the amount of the isopropanol dispersion (1) of PEDOT-PSS was changed to 15 g.

Example 13

The composition for a release agent was obtained in the same manner as in the Example 2, except that the amount of the isopropanol dispersion (1) of PEDOT-PSS was changed to 10 g.

Example 14

10.9 g of KS-723A, 2.74 g of KS-723B as condensation-curing type organopolysiloxanes and 0.5 g of dioctyl tin diacetate as a condensation catalyst were added to 30 g of the isopropanol dispersion (5) of PEDOT-PSS obtained in the Production Example 13. Then, the mixture was diluted with 45.86 g of methyl ethyl ketone and 10.0 g of diacetone alcohol, thereby obtaining a composition for a release agent.

Example 15

3 g of the compound represented by chemical formula III shown below as a condensation-curing type organopolysiloxane and 0.5 g of dioctyl tin diacetate as a condensation catalyst were added to 30 g of the isopropanol dispersion (1) of PEDOT-PSS obtained in Production Example 9 (a release component is a "composition (C)"). Then, the mixture was diluted with 45.86 g of methyl ethyl ketone and 10.0 g of diacetone alcohol, thereby obtaining a composition for a release agent.

[Chemical Formula 7]

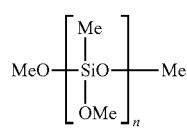

Chemical Formula III (n represents a positive number of 2 to 4)

Example 16

The composition for a release agent was obtained in the same manner as in the Example 1, except that 1 g of water was added to 30 g of the isopropanol dispersion (1) of PEDOT-PSS obtained in the Production Example 9 and the amount of methyl ethyl ketone was changed to 44.86 g.

Example 17

The composition for a release agent was obtained in the same manner as in the Example 1, except that 3 g of water was added to 30 g of the isopropanol dispersion (1) of PEDOT-PSS obtained in the Production Example 9 and the amount of methyl ethyl ketone was changed to 42.86 g.

Example 18

The composition for a release agent was obtained in the same manner as in the Example 1, except that 5 g of water was added to 30 g of the isopropanol dispersion (1) of PEDOT-PSS obtained in the Production Example 9 and the amount of methyl ethyl ketone was changed to 40.86 g.

Example 19

The composition for a release agent was obtained in the same manner as in the Example 1, except that 30 g of the isopropanol dispersion (1) of PEDOT-PSS of the Production Example 9 was changed to 30 g of the isopropanol dispersion (6) of the Production Example 14.

Example 20

The composition for a release agent was obtained in the same manner as in the Example 1, except that 30 g of the isopropanol dispersion (1) of PEDOT-PSS of the Production Example 9 was changed to 30 g of the isopropanol dispersion (7) of the Production Example 15.

Example 21

10.9 g of KS-723A and 2.74 g of KS-723B as condensation-curing type organopolysiloxanes and 0.5 g of dioctyl tin diacetate as a condensation catalyst were added to 30 g of the isopropanol dispersion (2) of PEDOT-PSS obtained in Production Example 10. Then, the mixture was diluted with 46.36 g of methyl ethyl ketone and 10.0 g of diacetone alcohol, thereby obtaining a composition for a release agent.

Example 22

10.9 g of KS-723A and 2.74 g of KS-723B as condensation-curing type organopolysiloxanes and 0.5 g of dioctyl tin diacetate as a condensation catalyst were added to 60 g of the isopropanol dispersion (3) of PEDOT-PSS obtained in Production Example 11. Then, the mixture was diluted with 16.36 g of methyl ethyl ketone and 10.0 g of diacetone alcohol, thereby obtaining a composition for a release agent.

Comparative Example 1

10.9 g of KS-723A and 2.74 g of KS-723B as condensation-curing type organopolysiloxanes and 0.5 g of dioctyl tin diacetate as a condensation catalyst were weighed. Then, 45.86 g of methyl ethyl ketone and 10.0 g of diacetone alcohol as organic solvents were added so as to adjust the solid content to 3%, thereby obtaining a composition for a release agent.

Comparative Example 2

10 g of X-62-470 and 0.4 g of dioctyl tin diacetate were weighed. Then 59.6 g of methyl ethyl ketone was added, thereby obtaining a composition for a release agent.

Comparative Example 3

The composition for a release agent was prepared in the same manner as in Comparative Example 2, except that KS-705F was used instead of X-62-470.

Comparative Example 4

The composition for a release agent was prepared in the same manner as in Example 4, except that the amount of the isopropanol dispersion of PEDOT-PSS in Example 4 was changed to 190 g.

Comparative Example 5

The composition for a release agent was prepared in the same manner as in Example 2, except that the amount of the isopropanol dispersion of PEDOT-PSS in Example 2 was changed to 5 g.

Comparative Example 6

The composition for a release agent was prepared in the same manner as in Example 1, except that the isopropanol dispersion (1) of PEDOT-PSS was changed to the isopropanol dispersion (4) of PEDOT-PSS.

Comparative Example 7

The composition for a release agent was prepared in the same manner as in Example 1, except that 7 g of water was added to 30 g of the isopropanol dispersion (1) of PEDOT-PSS obtained in the Production Example 9 and the amount of methyl ethyl ketone was changed to 38.86 g.

Comparative Example 8

The composition for a release agent was prepared in the same manner as in Example 1, except that 10 g of water was added to 30 g of the isopropanol dispersion (1) of PEDOT-PSS obtained in the Production Example 9 and the amount of methyl ethyl ketone was changed to 35.86 g.

Comparative Example 9

The composition for a release agent was prepared in the same manner as in Example 1, except that 30 g of the isopropanol dispersion (1) of PEDOT-PSS of the Production Example 9 was changed to 30 g of the isopropanol dispersion (10) of PEDOT-PSS.

<Evaluation>

With respect to each composition for a release agent, curable properties, force required peeling (hereinafter, referred to as "peel strength"), residual adhesion ratio, and surface resistivity were evaluated and measured by the following method. The results are shown in Tables 1 and 2.

[Curing Properties]

The obtained composition for a release agent was applied to a PET film having a thickness of 38 μm using barcoater, and heated at 120° C. for 1 minute in a hot air drier to form a release agent layer. The release agent layer was rubbed with a finger ten times, and the presence or absence of cloudiness or defects was visually observed, and evaluated in accordance with following criteria.

○: cloud and rub-off were not observed.

x: cloud and rub-off were observed.

[Peel Strength]

A release agent layer was formed in the same manner as in the curing properties, and polyester adhesion tape (product name: nitto-31B, manufactured by Nitto Denko Corporation) was laminated on the surface of the release agent layer, and a load of 1976 Pa was applied to the adhesion tape so as to adhere the polyester adhesion tape to the release agent layer. Using a tensile testing machine, the polyester adhesion tape was peeled from the release agent layer such that the angle between the polyester adhesion tape and the release agent layer became 180° (peeling speed: 0.3 m/min), and then, peel strength was measured. As the peel strength is smaller, the adhesion sheet can be easily peeled after the adhesion sheet is adhered to the release agent layer. That is, the adhesive sheet becomes a film having easy-peeling properties.

[Residual Adhesion Ratio (Subsequent Adhesion Ratio)]

A polyester adhesion tape was laminated on the release agent layer in the same manner as in the measurement of peel strength. Then, the laminated structure was left at room temperature for 20 hours, or the laminated structure was subjected to heat treatment at 85° C. for 20 hours. Next, the polyester adhesion tape was peeled from the release agent layer. The peeled polyester adhesion tape was adhered to a stainless panel. Thereafter, using a tensile testing machine, the polyester adhesion tape was peeled from the stainless panel and then, peel strength X was measured.

A polyester adhesion tape that had not been adhered to a release agent layer was adhered to a stainless board, and using a tensile testing machine, the polyester adhesion tape was peeled from the stainless board and then, peel strength Y was measured.

In accordance with the formula (peel strength X/peel strength Y)×100(%), residual adhesion ratio was calculated.

As the residual adhesion ratio becomes larger, the release properties the release agent layer becomes excellent, and deterioration of adhesion properties of polyester adhesion sheet which had been adhered to the release agent layer can be suppressed.

[Surface Resistivity]

Using Hiresta MCP-HT450 manufactured by Mitsubishi Chemical Corporation and a probe MCP-HTP12, surface resistivity was measured under applied voltage of 10 V. The result "OVER" in Table means that surface resistivity was too high to measure it.

TABLE 1

| | Amount of | | | | | Room temperature, 20 hr. | | 85° C., 20 hr. | | |
| --- | --- | --- | --- | --- | --- | --- | --- | --- | --- | --- |
| | Isopropanol dispersion of PEDOT-PSS | Mw of PSS | conductive component (Parts) | condensation-curing type organo-polysiloxanes | Water Content (%) | Curing property | Peeling Strength (N/25 mm) | Residual adhesion ratio (%) | Peeling Strength (N/25 mm) | Residual adhesion ratio (%) | Surface resistivity (Ω/□) |
| Example 1 | (1) | 300,000 | 3.4 | Composition (B) | 0.01 | ○ | 0.04 | 90.0 | 0.09 | 83.0 | $1 \times 10^{10}$ |
| Example 2 | (1) | 300,000 | 4.0 | Composition (B) | 0.01 | ○ | 0.03 | 73.0 | 0.06 | 62.0 | $1 \times 10^{8}$ |
| Example 3 | (1) | 300,000 | 4.0 | Composition (A) | 0.01 | ○ | 0.04 | 67.0 | 0.05 | 61.0 | $1 \times 10^{8}$ |
| Example 4 | (1) | 300,000 | 298.3 | Composition (B) | 0.01 | ○ | 5.14 | 79.0 | 5.32 | 59.0 | $5 \times 10^{5}$ |
| Example 5 | (1) | 300,000 | 210.5 | Composition (B) | 0.01 | ○ | 3.43 | 78.0 | 3.86 | 61.0 | $3 \times 10^{5}$ |
| Example 6 | (1) | 300,000 | 105.3 | Composition (B) | 0.01 | ○ | 2.83 | 82.0 | 2.90 | 65.0 | $2 \times 10^{6}$ |
| Example 7 | (1) | 300,000 | 64.8 | Composition (B) | 0.01 | ○ | 2.50 | 86.0 | 2.50 | 68.0 | $3 \times 10^{7}$ |
| Example 8 | (1) | 300,000 | 33.8 | Composition (B) | 0.01 | ○ | 1.50 | 87.0 | 1.50 | 70.0 | $4 \times 10^{7}$ |
| Example 9 | (1) | 300,000 | 16.9 | Composition (B) | 0.01 | ○ | 0.40 | 96.0 | 1.00 | 80.0 | $3 \times 10^{8}$ |
| Example 10 | (1) | 300,000 | 8.5 | Composition (B) | 0.01 | ○ | 0.06 | 91.0 | 0.25 | 82.0 | $2 \times 10^{9}$ |
| Example 11 | (1) | 300,000 | 2.6 | Composition (B) | 0.01 | ○ | 0.03 | 87.0 | 0.05 | 76.0 | $3 \times 10^{7}$ |
| Example 12 | (1) | 300,000 | 2.0 | Composition (B) | 0.01 | ○ | 0.03 | 87.0 | 0.05 | 76.0 | $3 \times 10^{8}$ |
| Example 13 | (1) | 300,000 | 1.3 | Composition (B) | 0.01 | ○ | 0.03 | 87.0 | 0.05 | 76.0 | $7 \times 10^{10}$ |
| Example 14 | (5) | 300,000 | 3.4 | Composition (B) | 0.01 | ○ | 0.06 | 90.0 | 0.19 | 79.0 | $3 \times 10^{9}$ |
| Example 15 | (1) | 300,000 | 3.4 | Composition (C) | 0.01 | ○ | 5.34 | 87.0 | 7.40 | 76.5 | $2 \times 10^{7}$ |
| Example 16 | (1) | 300,000 | 3.4 | Composition (B) | 1.0 | ○ | 0.05 | 90.4 | 0.15 | 80.0 | $2 \times 10^{8}$ |
| Example 17 | (1) | 300,000 | 3.4 | Composition (B) | 3.0 | ○ | 0.05 | 87.2 | 0.16 | 80.0 | $2 \times 10^{8}$ |
| Example 18 | (1) | 300,000 | 3.4 | Composition (B) | 5.0 | ○ | 0.34 | 94.8 | 1.14 | 74.0 | $3 \times 10^{8}$ |
| Example 19 | (6) | 200,000 | 3.4 | Composition (B) | 0.01 | ○ | 0.05 | 94.1 | 0.15 | 82.4 | $1 \times 10^{7}$ |
| Example 20 | (7) | 500,000 | 3.4 | Composition (B) | 0.01 | ○ | 0.05 | 90.4 | 0.20 | 80.8 | $2 \times 10^{8}$ |
| Example 21 | (2) | 300,000 | 3.4 | Composition (B) | 0.01 | ○ | 0.04 | 90.0 | 0.09 | 83.0 | $1 \times 10^{9}$ |
| Example 22 | (3) | 300,000 | 6.8 | Composition (B) | 0.01 | ○ | 0.05 | 90.0 | 0.10 | 82.0 | $3 \times 10^{9}$ |

TABLE 2

| | Isopropanol dispersion of PEDOT-PSS | Mw of PSS | Amount of conductive component (Parts) | condensation-curing type organo-polysiloxanes | Water Content (%) | Curing property | Peeling Strength (N/25 mm) | Residual adhesion ratio (%) | Peeling Strength (N/25 mm) | Residual adhesion ratio (%) | Surface resistivity (Ω/□) |
| --- | --- | --- | --- | --- | --- | --- | --- | --- | --- | --- | --- |
| Comparative Example 1 | — | — | 0.0 | Composition (B) | 0.01 | ○ | 0.04 | 90.0 | 0.09 | 84.0 | over |
| Comparative Example 2 | — | — | 0.0 | Composition (B) | 0.01 | ○ | 0.04 | 73.0 | 0.06 | 62.0 | over |
| Comparative Example 3 | — | — | 0.0 | Composition (A) | 0.01 | ○ | 0.04 | 76.0 | 0.05 | 62.0 | over |
| Comparative Example 4 | (1) | 300,000 | 333.3 | Composition (B) | 0.01 | ○ | 10.19 | 56.0 | 6.90 | 22.8 | $5 \times 10^{5}$ |
| Comparative Example 5 | (1) | 300,000 | 0.7 | Composition (B) | 0.01 | ○ | 0.04 | 87.0 | 0.05 | 76.0 | over |
| Comparative Example 6 | (4) | 300,000 | 3.4 | Composition (B) | 0.01 | ○ | 0.06 | 93.0 | 0.16 | 83.0 | over |
| Comparative Example 7 | (1) | 300,000 | 3.4 | Composition (B) | 7.00 | X | 2.34 | 84.3 | 2.72 | 23.2 | $3 \times 10^{8}$ |
| Comparative Example 8 | (1) | 300,000 | 3.4 | Composition (B) | 10.00 | X | 4.16 | 81.8 | 2.94 | 3.0 | $2 \times 10^{8}$ |
| Comparative Example 9 | (10) | 1,000,000 | 3.4 | Composition (B) | 0.01 | ○ | 0.06 | 90.9 | 0.20 | 81.8 | over |

With respect to the compositions for a release agent according to Examples 1 to 22, peel strength was low, and surface resistivity was low.

With respect to Comparative Examples 1 to 3 which did not contain the conductive component and Comparative Example 5 in which the amount of conductive component was small, surface resistivity was too high and could not be measured the value.

With respect to Comparative example 4 in which the amount of the conductive component was large, and the amount of the release component was relatively small, surface resistivity was high.

With respect to Comparative Example 6 in which the substituent of the amine compound coordinated to or bonded to the surplus sulfonate groups within a polystyrene sulfonate is the primary amine, the liquid was not stable, the conductive complex was incompatible with a silicone resin and therefore, uniform film could not be formed. As a result, surface resistivity could not be measured.

With respect to the compositions for a release agent of Comparative Examples 7 and 8 in which the water content was more than 5%, the curing failure has occurred and the peeling property was reduced.

With respect to the composition for a release agent of Comparative Example 9 which was produced by using the isopropanol dispersion of polystyrene sulfonate having a mass average molecular mass of 1,000,000, dispersion stability was low and conductivity did not express.

The invention claimed is:

1. A composition for an antistatic release agent comprising:
   a release component, a conductive component, an organic solvent, and water,
   wherein the release component contains a condensation-type organopolysiloxane,
   the conductive component contains a complex with a π-conjugated electrically conductive polymer and a polyanion having a molecular weight of 20,000 to 900,000,
   an amount of the conductive component is 1 to 300 parts by mass, relative to 100 parts by mass of the release component,
   at least one amine compound selected from the group consisting of a secondary amine, a tertiary amine or a quaternary ammonium salt is coordinated to or bonded to a portion of anion groups in the polyanion as an ion pair,
   the water content is 5% by mass or less, relative to a total amount of the composition for an antistatic release agent, and
   an amount of the amine compound relative to the polyanion is 0.1 to 10 molar equivalents.

2. An antistatic release film comprising:
   a substrate and a release agent layer formed on at least one surface of the substrate,
   wherein the substrate is composed of a plastic film or a paper, and
   the release agent layer is formed from a hardened material of the composition for an antistatic release agent of claim 1.

3. The composition according to claim 1, wherein the release component is a silicone-based material which is a condensation-curing type organopolysiloxane containing at least one composition selected from the group consisting of the following compositions (A) to (C):
   a composition (A) including (A-1) organopolysiloxane having at least two hydroxy groups within one molecule thereof, (A-2) organopolysiloxane having at least three SiH groups within one molecule thereof, and (A-3) condensation catalyst;
   a composition (B) including (B-1) organopolysiloxane having at least two hydroxy groups within one molecule thereof, (B-2) organopolysiloxane having at least three hydrolyzable groups within one molecule thereof, and (B-3) condensation catalyst; and
   a composition (C) including (C-1) organopolysiloxane having at least three hydrolyzable groups within one molecule thereof, and (C-2) condensation catalyst.

4. The composition according to claim 3, wherein each of the components (A-1) and (B-1) is at least one organopolysiloxane represented by general formulae (1-1), (1-2) and (1-3):

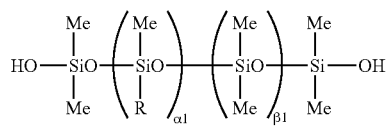
(1-1)

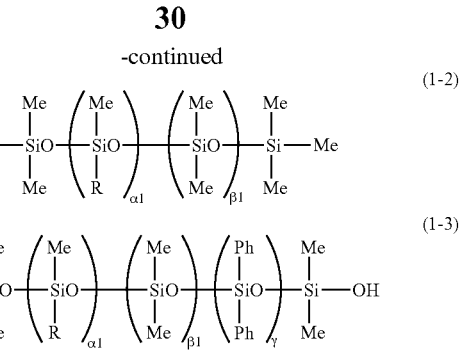

wherein R represents a hydroxy group, a monovalent hydrocarbon group having 1 to 20 carbon atoms, or siloxane residue represented by general formula (2-1) or (2-2):

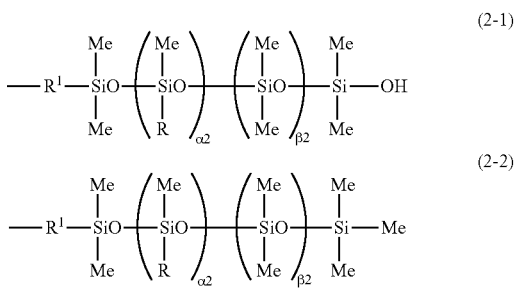

wherein $R^1$ represents an oxygen atom or an alkylene group having 1 to 6 carbon atoms, R is the same as above, $\alpha 1$ represents an integer of 0 to 1,000, $\beta 1$ represents an integer of 50 to 9,000, $\alpha 2$ represents an integer of 0 to 900, $\beta 2$ represents an integer of 0 to 9,000, $\gamma$ represents an integer of 1 to 3,000, Me represents a methyl group, and Ph represents a phenyl group.

5. The composition according to claim 3, wherein the component (A-2) is at least one organohydrogenpolysiloxane selected from the group consisting of a polymer of methylhydrogenpolysiloxane; a copolymer of methylhydrogenpolysiloxane and dimethylpolysiloxane; a copolymer of methylhydrogenpolysiloxane and methylphenylpolysiloxane; a copolymer of methylhydrogenpolysiloxane, dimethylpolysiloxane and methylphenylpolysiloxane; and a copolymer of methylhydrogenpolysiloxane, dimethylpolysiloxane and diphenylpolysiloxane.

6. The composition according to claim 3, wherein the component (A-2) is at least one compound represented by general formulae (3-1) to (3-5):

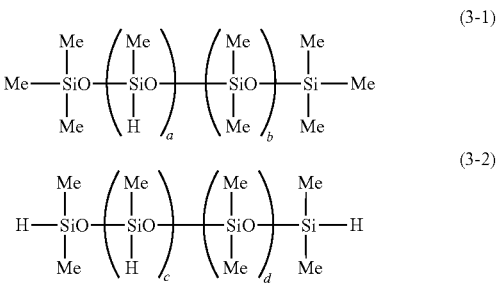

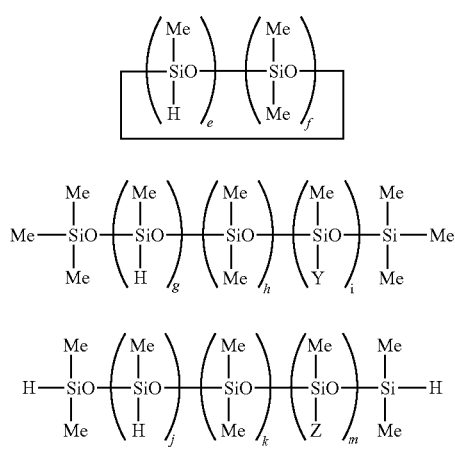

(3-3)

(3-4)

(3-5)

wherein Me represents a methyl group, Y and Z are groups represented by general formulae (4-1) and (4-2), respectively, each of a, b, c, d, e, f, g, h, i, j, k, m, n, o, p, and q is a number such that one molecule contains three or more SiH groups and is an integer within the range as follows: a and e each independently represents an integer of 3 to 500, c represents an integer of 1 to 500, b, d, f, g, h, i, j, k, and m each independently represents an integer of 0 to 500:

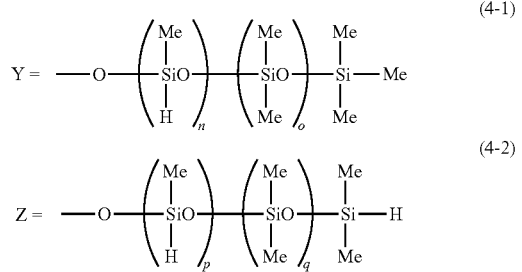

(4-1)

(4-2)

wherein Me represents a methyl group, n, o, p and q each independently represents an integer of 0 to 500.

7. The composition according to claim 3, wherein the component (B-2) is at least one organopolysiloxanes represented by general formulae (5-1) to (5-4):

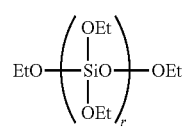

(5-1)

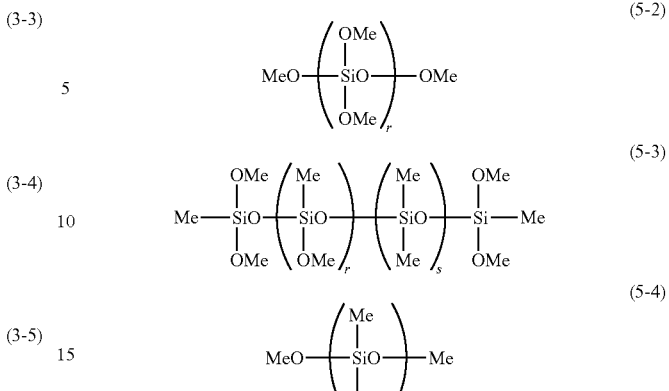

(5-2)

(5-3)

(5-4)

wherein r represents an integer of 1 to 200, s represents an integer of 1 to 200, n represents an integer of 1 to 100, Me represents a methyl group, and Et represents an ethyl group.

8. The composition according to claim 1 or 3, wherein the π-conjugated electrically conductive polymer is a poly (3,4-ethylenedioxythiophene).

9. The composition according to claim 1 or 3, wherein the polyanion has a sulfonate group.

10. The composition according to claim 1 or 3, wherein the amine compound has at least one substituent selected from the group consisting of an alkyl group having 4 or more and 12 or less carbon atoms, an aryl group having 6 or more and 10 or less carbon atoms, an aralkyl group having 7 or more and 10 or less carbon atoms, an alkylene group having 2 or more and 4 or less carbon atoms, an arylene group having 6 or more and 10 or less carbon atoms, an aralkylene group having 7 or more and 10 or less carbon atoms and an oxyalkylene group having 2 or more and 6 or less carbon atoms.

11. The composition according to claim 1, wherein the amine-type compound is at least one amine compound selected from the group consisting of tributylamine, trihexylamine, trioctylamine, and a tertiary amine compound represented by the following chemical formula I or II:

Chemical formula I

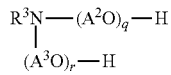

Chemical formula II wherein $R^1$, $R^2$, and $R^3$ each independently represents an alkyl group of 1 to 24 carbon atoms; $A^1O$, $A^2O$, and $A^3O$ each independently represents an oxyalkylene group having 2 to 4 carbon atoms; p, q, and r each independently represents $1 \leq p, q, r \leq 100$, and q and r meet the requirement of $0 < q+r \leq 100$.

* * * * *